United States Patent [19]
Takeda

[11] Patent Number: 6,084,844
[45] Date of Patent: Jul. 4, 2000

[54] OPTICAL HEAD ASSEMBLY

[75] Inventor: Tadashi Takeda, Nagano, Japan

[73] Assignee: Sankyo Seiki Mfg.Co., Ltd., Nagano-ken, Japan

[21] Appl. No.: 09/045,100

[22] Filed: Mar. 20, 1998

[30] Foreign Application Priority Data

Mar. 21, 1997 [JP] Japan ................................. 9-067718
Jul. 16, 1997 [JP] Japan ................................. 9-190828

[51] Int. Cl.[7] .................................................. G11B 7/00
[52] U.S. Cl. .......................... 369/112; 369/109; 369/103
[58] Field of Search ........................... 369/44.12, 44.14, 369/112, 110, 109, 103, 116

[56] References Cited

U.S. PATENT DOCUMENTS

| | | | |
|---|---|---|---|
| 5,136,152 | 8/1992 | Lee | 369/112 |
| 5,361,244 | 11/1994 | Nakamura et al. | 369/4.35 |
| 5,544,143 | 8/1996 | Kay et al. | 369/109 |
| 5,953,295 | 9/1999 | Nagano | 369/112 |

FOREIGN PATENT DOCUMENTS

2-265036 10/1990 Japan .
3-269835 12/1991 Japan .
8-7872 1/1996 Japan .
2543227 7/1996 Japan .

*Primary Examiner*—Nabil Hindi
*Attorney, Agent, or Firm*—McAulay Nissen Goldberg Kiel & Hand, LLP

[57] ABSTRACT

An optical head assembly comprises a laser light source, an objective lens for converging laser light rays emitted from the laser light source at an optical recording medium, a hologram element placed in the optical path between the laser light source and the objective lens, an optical detector for signaling that detects returning light rays from the optical recording medium and an optical detector for monitoring that detects a portion of the laser beams emitted from the laser source toward the optical recording medium. The hologram element has first and second diffraction areas; the first diffraction area diffracting the returning light rays to guide them to the optical detector for signaling; the second diffraction area reflecting and diffracting a portion of the light rays emitted from the laser light source at a fringe-like reflecting portion to guide them to the optical detector for monitoring.

8 Claims, 6 Drawing Sheets

OPTICAL HEAD ASSEMBLY

BACKGROUND OF THE INVENTION a) Field of the Invention

The present invention relates to an optical head assembly for recording to/reproducing from optical recording media. In particular the present invention relates to an optical head assembly that performs feedback control for the light emitting amount of a laser light source (light intensity) by directly detecting a portion of laser light rays emitted from the laser light source toward the optical recording medium.

b) Description of the Related Art

In the optical head assembly for recording to/reproducing from optical recording media such as CD and DVD, the amount of laser light emitted from a laser light source greatly fluctuates depending on temperature and elapse. Therefore, it is necessary to perform feedback control for the light emitting amount of the laser light source to constantly obtain a predetermined output of emission from the laser light source.

Known as a method for controlling light emitting amount of the laser light source is a technique that directly detects ongoing light rays emitted from the laser light source toward the optical recording medium. Optical head assembly employing this method are disclosed in Patent Publication No. 2543227, Unexamined Japanese Patent Application H2-265036, Japanese Patent Publication H8-7872, Unexamined Japanese Patent Application H3-269835 and the like.

The optical head assembly disclosed in Patent Publication No. 2543227 employs a hologram lens in which a first diffraction area for diffracting returning light rays from an optical recording medium to guide them to an optical detector for signaling and a second diffraction area for reflecting and diffracting, a portion of the ongoing light rays emitted from a laser light source to guide it to an optical detector for monitoring. The second diffraction area of the patent is configured in which a metallic film is coated over a diffraction grating fabricated in the surface of a base substrate.

In the optical head assembly disclosed in Unexamined Japanese Patent Application H2-265036, a hologram lens having almost identical configuration as the above hologram is employed, and an optical detector for signaling and an optical detector for monitoring are formed on the same substrate.

Further, the optical head assembly disclosed in Japanese Patent Publication H8-7872 employs a hologram having only the first diffraction area and an optical element having a predetermined index of reflection, with which the ongoing light is partially reflected toward the optical detector for monitoring. In this optical head assembly also, optical detectors for signaling and monitoring are formed on the same substrate.

In the optical head assembly disclosed in Unexamined Japanese Patent Application H3-269835, the first and second diffraction areas are formed on the surface of a reflection mirror placed halfway on the optical path between the laser light source and the objective lens.

Problems the Invention Aims to Solve

In the optical head assembly disclosed in JP No. 2543227 and H2-265036, a metallic film is coated over a diffraction grating; therefore, ridges and grooves and pitch of the grating easily become imprecise due to the metallic film, thus causing ghost.

In the optical head assembly disclosed in JP H8-7872, a portion of the ongoing light is reflected at the light receiving element having a predetermined index of reflection; therefore, the reflected light is a diffuse light. Consequently the diameter of the light beam guided to the optical detector becomes extremely large. With this, when the optical detector for monitoring is small, the photoelectric current required to control the light-emitting-amount of the laser light source cannot be sufficiently obtained.

In the optical head assembly disclosed in JP H3-269835, the diameter of the ongoing light beam becomes extremely large at the surface of the reflection mirror. This requires use of a widened diffraction grating in order to reflect and diffract the ongoing light, thus raising the cost for the reflection mirror.

Also in the optical head assembly disclosed in JP 2543227, the first diffraction area and second diffraction area have differences in the depth of the ridges and grooves of the diffraction grating therein; therefore, the diffraction grating in each of the areas cannot be produced in the same process. In other words, when forming the diffraction gratings on both areas simultaneously, either one or the other diffraction property needs to be neglected. On the other hand, if the diffraction gratings on both areas are formed in separate (multiple) processes, the unit price for a hologram lens will be increased and the precision in the diffraction grating is easily degraded because of the increased processes.

Moreover in these optical head assemblies, the second diffraction area is located outer circumference of the first diffraction area; therefore, the ongoing light rays from the laser light source are incident on the second diffraction area with a large angle of incident. In addition, the outer-side-portion of the ongoing light beam is reflected and diffracted inwardly at the second diffraction area to guide a portion of the ongoing light beam to the optical detector for monitoring. It is necessary to form a diffraction grating of extremely narrow pitch in order to give such a diffraction property to the second diffraction area. However, it is difficult to fabricate a minute diffraction grating with a high precision, and accordingly there is a problem that a desired diffraction property cannot be obtained because of the poor precision of the grating.

OBJECT AND SUMMARY OF THE INVENTION

A primary object of the present invention is to provide an optical head assembly, without having the above problems, capable of performing feedback control for light-emitting-amount (light intensity) of a laser light source by reflecting and diffracting a portion of the ongoing light from the laser light source.

In accordance with the invention, an optical head assembly comprises a laser light source, an objective lens for converging laser light rays emitted from the laser light source at an optical recording medium, a hologram element placed in the optical path between the laser light source and the objective lens, an optical detector for signaling that detects returning light rays from the optical recording medium and an optical detector for monitoring that detects a portion of the laser beams emitted from the laser source toward the optical recording medium. The hologram element has first and second diffraction areas; the first diffraction area diffracting the returning light rays to guide them to the optical detector for signaling; the second diffraction area reflecting and diffracting a portion of the light rays emitted from the laser light source at a fringe-like reflecting portion to guide them to the optical detector for monitoring.

DESCRIPTION OF THE PREFERRED EMBODIMENTS

An example of an optical head assembly to which the present invention is applied will be described referring to the drawings. Note that each component of the optical head assembly is placed three-dimensionally; therefore, the mutually orthogonal direction are respectively the direction X, the direction Y, and the direction Z, and with respect to those coordinate axes the position and direction of each component will be described.

Figure 1A:
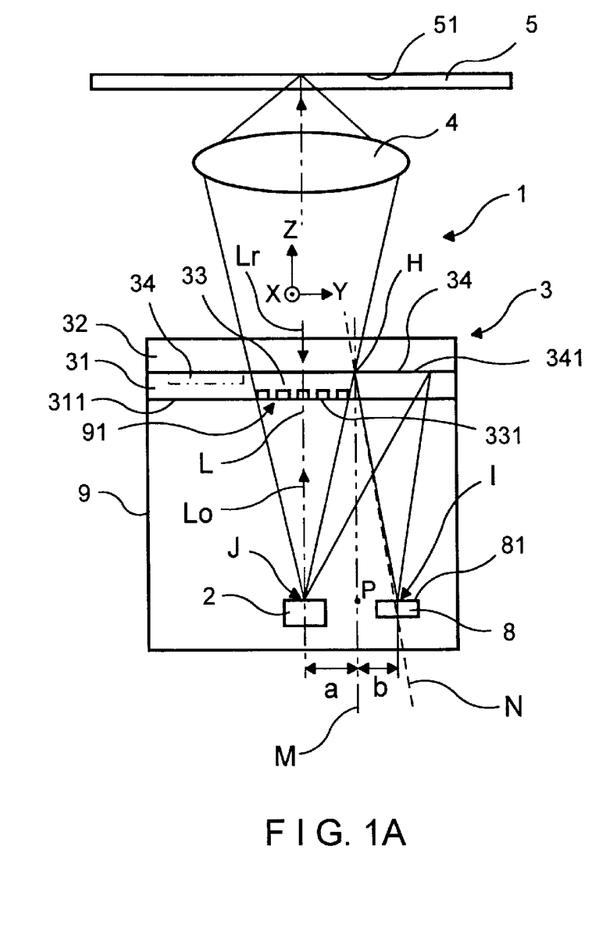
FIG. 1(A) illustrates a construction of an optical head assembly viewed from the direction X.
Figure 1B:
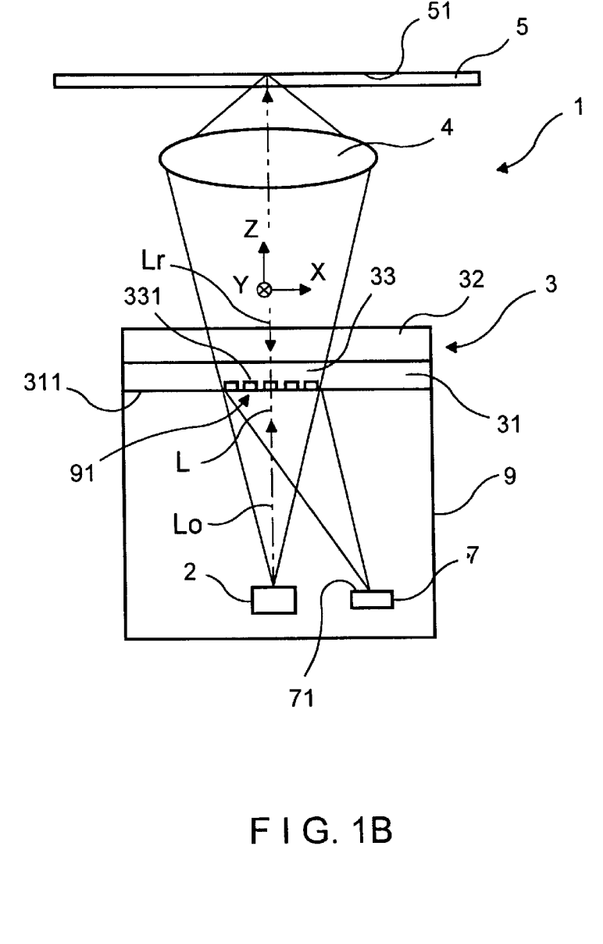
FIG. 1(B) illustrates a construction of the optical head assembly viewed from the direction Y.

FIG. 1(A) illustrates a construction of the optical head assembly viewed from the direction X; FIG. 1(B) illustrates a construction of the optical head assembly viewed from the direction Y. Note that the direction X is the tracking direction of an objective lens, the direction Y is the track direction formed on an optical recording medium, and the direction Z is the focusing direction of the objective lens.

As illustrated in FIGS. 1(A) and (B), the optical head assembly 1 comprises a semiconductor laser module 2 as a laser light source, a hologram lens 3, and an objective lens 4, positioned in this sequence from the semiconductor laser module 2 toward an optical recording medium 5 (along the direction Z). The optical head assembly 1 also comprises a optical detector for signaling 7 that receives a returning light ray Lr from the optical recording medium 5 and a optical detector for monitoring 8 that receives a portion of a laser light (ongoing light) Lo from the semiconductor laser module 2 reflected and diffracted at the hologram lens 3.

Figure 2A:
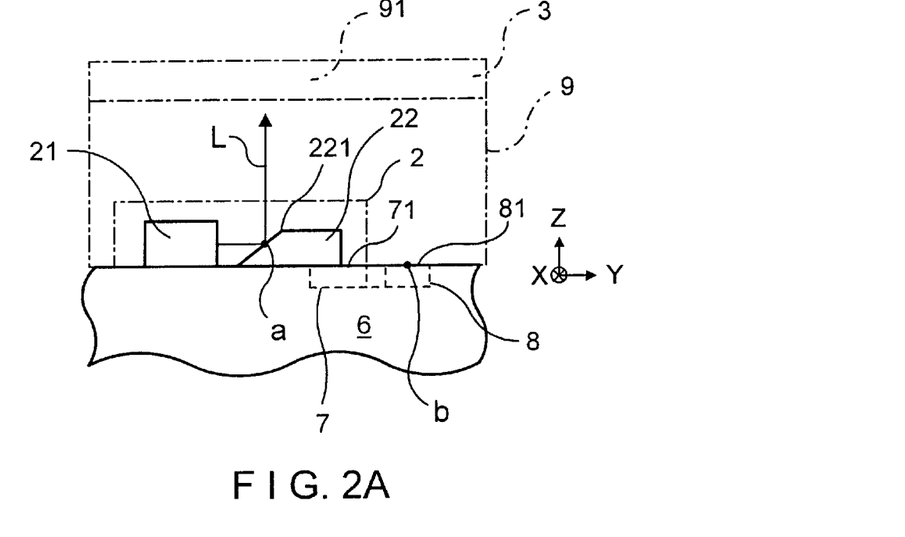
FIG. 2(A) illustrates a positional relationship of the semiconductor laser module, the optical detector for signaling, and the optical detector for monitoring, viewed from the direction X.
Figure 2B:
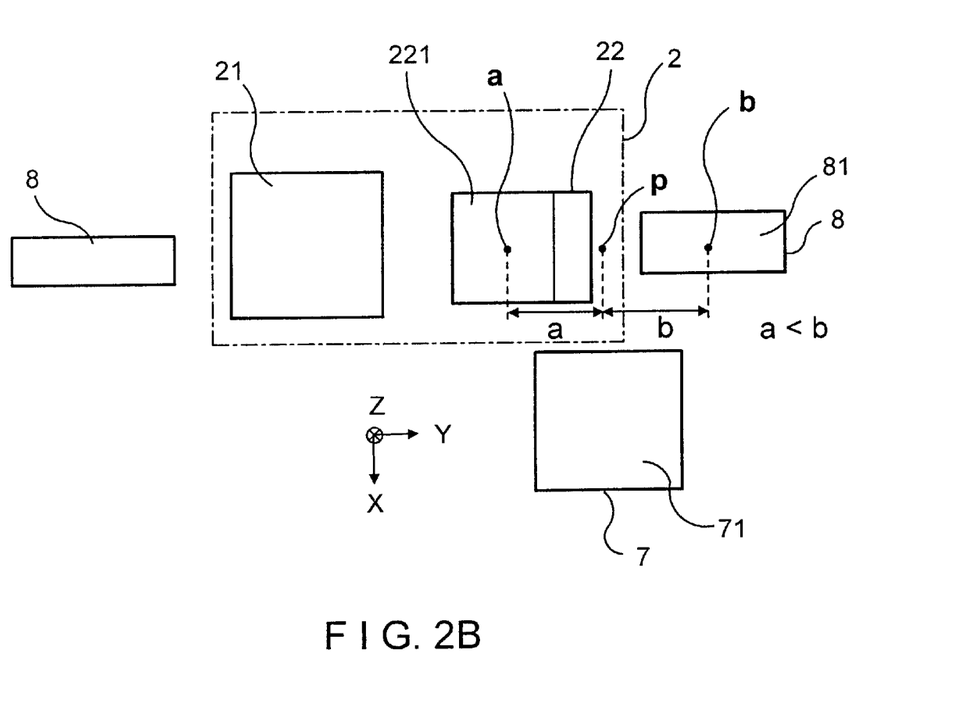
FIG. 2(B) illustrates the positional relationship of the semiconductor laser module, the optical detector for signaling, and the optical detector for monitoring, viewed from the direction Z.

As illustrated in FIGS. 2(A) and (B), the semiconductor laser module 2 has a laser diode 21 placed so as to emit the laser light Lo in the direction Y, and a mirror 22 that reflects the laser light Lo coming from the laser diode 21 to guide the laser light Lo toward the direction Z.

The laser diode 21 is mounted on a semiconductor substrate 6 directly or via a sub-mount. The active layer of the laser diode 21 is parallel to the surface of the semiconductor substrate 6 (XY plane), and therefrom the laser light Lo having a wavefront of oval shape elongated in the direction Z is emitted.

The mirror 22 has a reflecting surface which is tilted by 45° with respect to the emerging direction of the laser light Lo emitted from the laser diode 21. The mirror 22 can be produced by, for example, partially etching the semiconductor substrate 6. Note that, instead of etching the substrate 6, an independent optical component may be mounted on the semiconductor substrate 6. Also if the laser diode 21 is placed with the emitting surface thereof to face the hologram lens 3, the mirror 22 can be omitted.

The optical detector for signaling 7 and optical detector for monitoring 8 are formed directly on the same semiconductor substrate 6. The optical detector for signaling 7 is formed at a position away from one of the edges in the direction X of the semiconductor laser module 2 by a predetermined distance in the direction X. The optical detector for monitoring 8 is formed at a position away from one of the edges in the direction Y of the semiconductor laser module 2 by a predetermined distance in the direction Y.

The laser light Lo emitted from the laser diode 21 travels in the direction Y and enters a reflecting surface 221 of the mirror 22. The laser light beam Lo is bent at the reflecting surface 221 by 90° and guided in the direction Z. For this reason, in this embodiment, a substantial emitting point J of the semiconductor laser module 2 is positioned on the reflecting surface 221 of the reflection mirror 22. The laser light Lo emitted from the laser diode 21 is emitted toward the optical recording medium 5 as a laser light Lo having a wavefront of an oval shape elongated in the direction Z, thick in the direction Y. The laser light Lo enters the hologram lens 3.

In the optical head assembly 1 of this embodiment, the semiconductor laser module 2 and optical detectors 7 and 8 are stored in a package 9 mounted on the surface of the semiconductor substrate 6. A light incident/exit window 91 is formed as an opening above the package 9, in the ongoing direction of the laser light Lo from the semiconductor laser module 2. In this embodiment, the hologram lens 3 is installed at the light incident/exit window 91 so as to make the inside the package 9 air-tight. With this, an optical path for the laser light Lo from the semiconductor laser module 2 to the optical recording medium 5 can be ensured. Also, the semiconductor laser module 2, optical detector for signaling 7 and optical detector for monitoring 8 can be protected from dust, particles, etc.

Figure 3A:
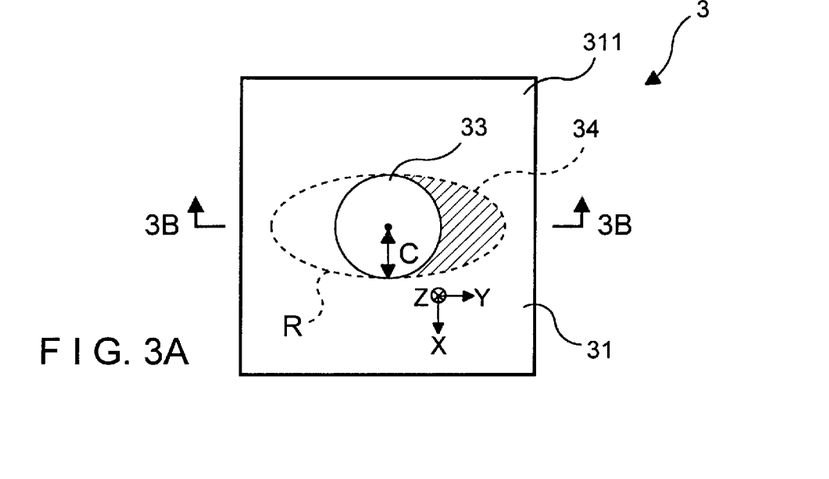
FIG. 3(A) is a plan view of a hologram lens.
Figure 3B:
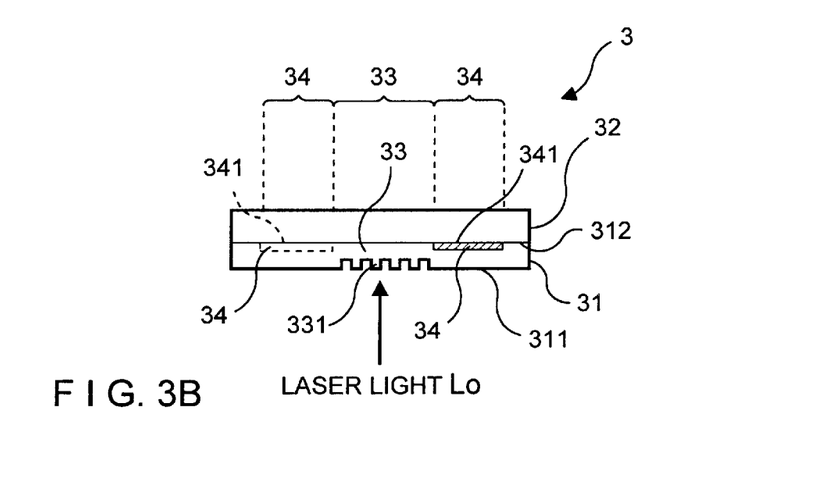
FIG. 3(B) is a cross-sectional view of the hologram lens.

FIGS. 3(A) and (B) respectively illustrate the plan view and the cross-sectional view of the hologram lens 3. In FIG. 3(A), an oval area R indicated by broken lines is the area to be illuminated with the laser light Lo. The hologram lens 3 has a base substrate 31 including a first surface 311 (in this embodiment, one of the surfaces of the substrate on which the laser light Lo emitted from the laser diode 21 is incident) and a second surface 312 (the other surface of the substrate from which the laser light Lo emitted from the laser diode 21 emerges) and a protective substrate 32 attached to the second surface 312 of the base substrate 31. Both the base substrate 31 and protective substrate 32 have an optical property of transmitting the laser light Lo emitted from the semiconductor laser module 2. In the first surface 311 of the base substrate 31, a first diffraction area 33 is formed for diffracting a returning light ray Lr from the optical recording medium 5 to guide it to the optical detector for signaling 7. Also in the second surface 312 of the base substrate 31, a second diffraction area 34 is formed for reflecting and diffracting a portion of the laser light Lo emitted from the semiconductor laser module 2 toward the optical recording medium 5 to guide the reflected and diffracted light to the optical detector for monitoring 8.

The first diffraction area 33 is concentric with the illumination area R in the first surface 311 of the base substrate 31, is formed circular of a radius, c, approximately equal to a radius of the illumination area R in the short axis direction (direction X), and consists of a first diffraction grating of ridges and grooves 331 formed in the first surface 311. The first diffraction grating 331 is configured in such a grating pattern that it transmits the laser light Lo from the semiconductor laser module 2 and diffracts the returning light ray Lr from the optical recording medium 5 to converge them at a light receiving plane 71 of the optical detector for signaling 7. Note that it is desirable to form the first diffraction area 33 in a size larger than the predetermined radius thereof, taking account of errors in mounting the semiconductor laser module 2, hologram lens 3, objective lens 4, etc. and errors in emitting angle of the laser light from the semiconductor laser module 2, and of shifts of the objective lens 4 caused by the tracking movement.

Also, the second diffraction area 34 is formed in either one (the area indicated by diagonal lines in FIG. 3(A)) of the areas at both sides in the second surface 312, excluding, from the illumination area R in the second surface 312 of the base substrate 31, the partial area in the second surface 312 to which the first diffraction area 33 is projected onto the second surface 312. The second diffraction area 34 is configured to be a second diffraction grating 341 described later and the surface thereof in FIG. 3(B) is covered with the protective substrate 32.

Figure 4:
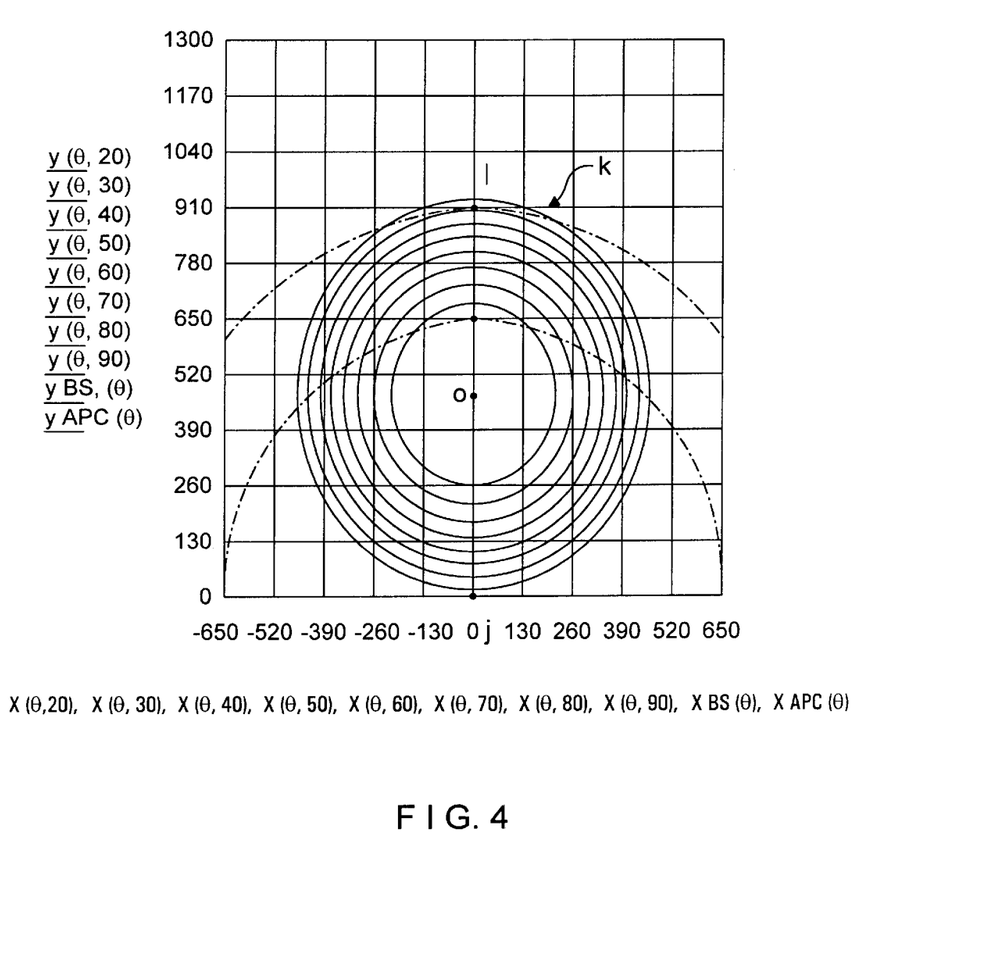
FIG. 4 illustrates a condition where the light incident on the second diffraction area is reflected and diffracted.
Figure 5:
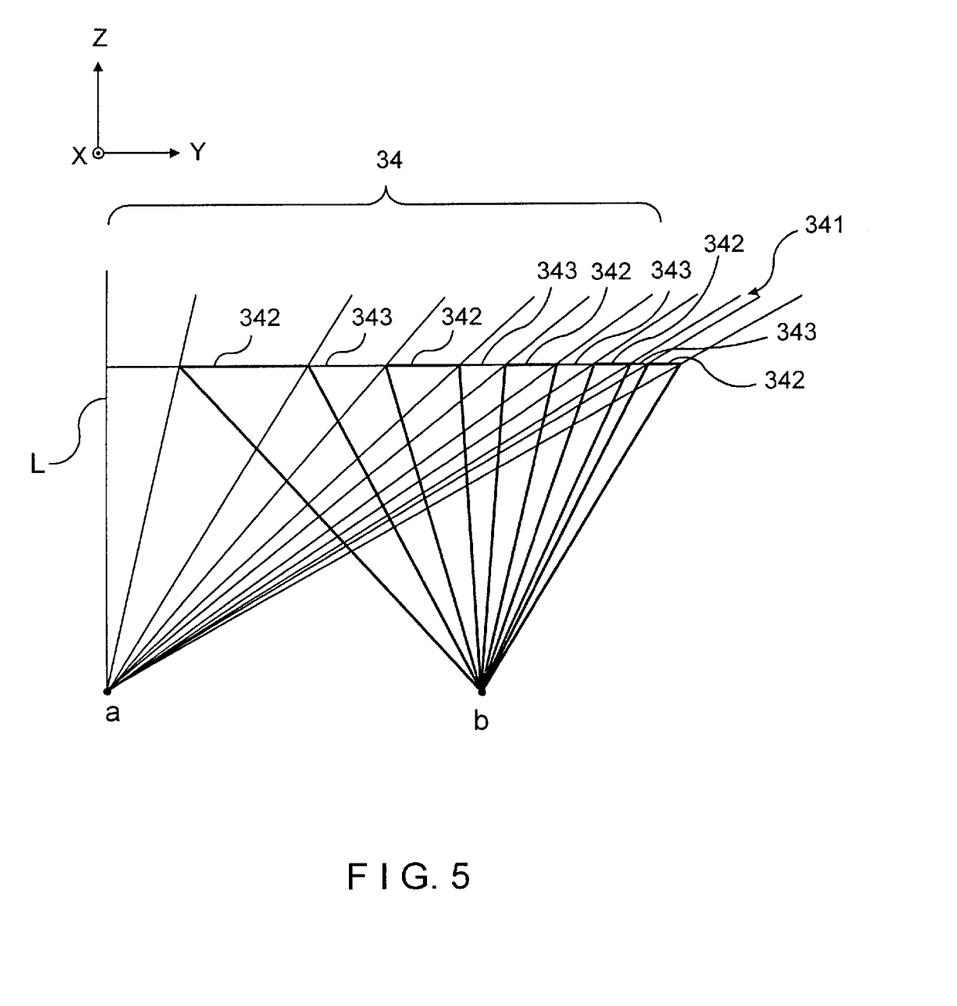
FIG. 5 illustrates a pattern of a bright-dark-type diffraction grating consisting of reflecting portion and non-reflecting portion.

Now the second diffraction grating 341 formed in the second diffraction area 34 in FIG. 3(B) will now be described. As illustrated in FIG. 4, the second diffraction grating 341 is of a bright-dark type, in which a reflecting portion 342 that reflects the laser light Lo from the semiconductor laser module 2 and a non-reflecting portion 343 that does not reflect the laser light Lo from the semiconductor laser module 2 are alternately formed in a fringe pattern. The reflecting portion 342 can be formed of a metallic film such as Al, F, Ne-Fe, Au, Cr, and the like. The grating pattern consisting of the reflecting portion 342 and non-reflecting portion 343 is set to be such a pattern that a portion of the laser light Lo incident on the second diffraction grating 341 is reflected and diffracted at the reflecting portion 342 and converged at the light receiving plane 81 of the optical detector for monitoring 8. Specifically, the grating pattern is non-uniform such that the pitch of the grating becomes smaller on the whole as it goes away from the optical axis L of the laser light Lo emitted from the semiconductor laser module 2.

For forming such a second diffraction grating 341, a photomask having a predetermined pattern is first fabricated, and then a metallic film formed on the surface (the second surface 312) of the base substrate 31 may be patterned by photolithography technology using the photomask. The pattern on the photomask may be made in correspondence with an interference fringe K generated by an interference between a spherical wave, which is emitted from the center of the light receiving plane 81 of the optical detector for monitoring 8 used as a light source, and another spherical wave, which is emitted from the emitting point J of the semiconductor laser module 2 as a light source. Such a pattern of the interference fringe K can be obtained by computer simulation determining the position at which an optical path length difference becomes integer multiple of the wavelength of the laser light Lo, the optical path length difference being between the optical path from the emitting point J of the semiconductor laser module 2 to the second surface 312 of the base substrate 31 and the optical path from the second surface 312 of the base substrate 31 to the center of the light receiving plane 81 of the optical detector for monitoring 8. By using the photomask configured in such a manner, the bright-dark-type second diffraction grating, which has a diffraction property of converging the laser light reflected from the second diffraction area 34 at the light receiving plane of the optical detector for monitoring 8, can be easily fabricated.

Figure 3C:
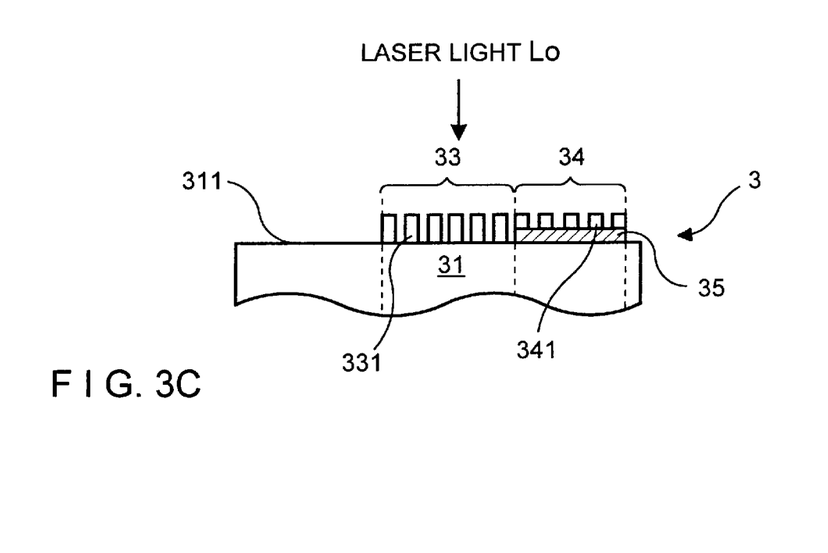
FIG. 3(C) illustrates a construction of another hologram lens different from the one illustrated in FIG. 3(B)

The hologram lens 3 may be configured as in FIG. 3(C) other than in FIG. 3(B). In other words, In FIG. 3(C), the second diffraction area 34 consists of a transparent substrate 31 as a base, a metallic reflective film 35 coated on the light-incident-side surface 311 of the transparent substrate 31, and a second diffraction grating of ridges and grooves 341 fabricated in the surface of the metallic reflective film 35. Note that the second diffraction grating 34 is given a diffraction property by which the light reflected and diffracted at the second diffraction area 341 is converged at the optical detector for monitoring 8.

As understood from FIG. 1 and FIG. 4, in the optical head assembly 1 configured in such a manner, the hologram lens 3 is mounted at the light incident/exit window 91 of the package 9 such that the first surface 311 of the base substrate 31 acts as the light incident plane for the laser light Lo emitted from the semiconductor laser module 2; therefore, the laser light incident on the first diffraction area 33, a portion of the laser light Lo incident on the hologram lens 3 from the semiconductor laser module 2, is transmitted through the first diffraction area 33 and directly guided to the objective lens 4. The laser light guided to the objective lens 4 converges through the objective lens 4 as a light spot at a recording surface 51 of the optical recording medium 5. Meanwhile, the laser light incident on the second diffraction area 34, a portion of the laser light Lo incident on the hologram lens 3, is reflected and diffracted with only the light incident on the refection portion 342 in the second diffraction area 34 and converges at the light receiving plane 81 of the optical detector for monitoring 8. Then with the photoelectric current of the optical detector for monitoring 8, feedback control for the light-emitting amount of the semiconductor laser module 2, that is, the laser diode 21 is performed.

On the other hand, the laser light that does not enter the first and second diffraction area 33, 34 and the laser light incident on the non-reflecting portion 343 of the second diffraction area 34, which are the portion of the laser light Lo incident on the hologram lens 3, pass through the base substrate 31. In this manner, in this embodiment, the above mentioned light is prevented from being reflected at the base substrate 31 and entering the optical detector for signaling 7 and optical detector for monitoring 8.

The returning light ray Lr modulated and reflected at the recording surface 51 of the optical recording medium 5 passes through the objective lens 4 and again enters the first diffraction area 33 of the hologram lens 3. The returning light ray Lr incident on the first diffraction area 33 is diffracted by the first diffraction grating 331 to converge at the light receiving plane 71 of the optical detector for signaling 7. In this embodiment, reading data, tracking control and focusing control of the objective lens 4 are performed upon receiving pit signals, tracking error signals, and focusing error signals from the photoelectric current from the optical detector for signaling 7.

In the optical head assembly 1 of this embodiment illustrated in FIG. 3(B), the reflecting portion 342 and non-reflecting portion 343 are formed in fringe on the second diffraction area 34 to guide a portion of the laser light Lo from the semiconductor laser module 2 to the optical detector for monitoring 8. In the optical head assembly 1 of this embodiment illustrated in FIG. 3(C), the second diffraction area 34 is constituted by forming the second diffraction grating 341 on the surface of the metallic reflective film 35 coated on the surface 311 of the transparent substrate 31. This can prevent the degrading of the diffraction grating, which normally originates from the grating pitch shifts or unmatched depth of ridges and grooves caused by a conventionally configured diffraction grating having a metallic film coated on the surface of the ridges and grooves. Thus, a desired diffraction grating property can be easily obtained. Therefore, ghosts are precluded from occurring. Also, since the light is reflected and diffracted at the second diffraction area 34 toward the optical detector for monitoring 8 to converge thereat, the beam diameter of the light at the light receiving plane 81 of the optical detector 8 can be kept small, even when using a optical detector for monitoring having a small light receiving plane, sufficient photoelectric current required for controlling light emitting amount of the laser diode 21 can be ensured. In addition, the optical detector for monitoring 8 can be small, and the size of the semiconductor substrate 6 can be accordingly small. Further, in the optical head assembly 1 of this embodiment illustrated in FIG. 3(B), the second diffraction area 34 can be made small, thus preventing the price of the hologram lens 3 from increasing greatly, unlike forming the diffraction grating on the surface of the reflective mirror. Furthermore, while the diffraction grating of ridges and grooves is formed by, for example, etching the first diffraction area 33, a metallic film deposited on the second diffraction area 34 by evaporation, etc. may be patterned in a predetermined fringe pattern. Thus, each diffraction area 33, 34 can be formed in different processes under suitable conditions. Therefore, unlike forming the diffraction grating of ridges and grooves in each of the diffraction area 33 and 34 by etching all at once, the first and second diffraction gratings 331 and 341 can be fabricated precisely at a low cost.

A $\lambda/4$ wavelength plate may be placed in the optical path between the hologram lens 3 and the objective lens 4 and an optical polarizing property may be given to the hologram lens 3 to efficiently transmit the laser light Lo from the semiconductor laser module 2 and efficiently diffract the returning light ray Lr from the optical recording medium 5. With such an optical construction, the second diffraction area having conventionally configured grooves and ridges cannot efficiently reflect and diffract the laser light Lo toward the optical detector for monitoring 8 because the area is affected in the polarizing direction of the laser light Lo emitted from the semiconductor laser module 2. On the other hand, by forming the second diffraction area 34 having a bright-dark type diffraction grating, in which the reflecting portion 342 and non-reflecting portion 343 are formed in fringe, as described with the optical head assembly 1 of this embodiment illustrated in FIG. 3(B), the laser light incident on the second diffraction area 34 34 can be reflected and diffracted toward the optical detector for monitoring 8, being independent from the polarizing direction of the laser light Lo.

In the optical head assembly 1 of this embodiment illustrated in FIG. 3(B), the first diffraction area 33 and second diffraction area 34 are formed on the opposite surfaces of the base substrate 31; therefore, in a fabrication process of a diffraction grating 331, 341 in each area 33, 34, a conventional problem of degrading one of the diffraction grating properties that occurs while fabricating the other can be prevented. From this viewpoint, the diffraction property of each area 33, 34 can be suitably determined.

Next each of the optical detectors 7 and 8 will be described referring to FIGS. 1 and 2. In FIG. 1(A), the double dashed line M indicates a line perpendicular to the second diffraction area 34, which is drawn from a starting point of a boundary point H of the second diffraction area 34 closest to the emitting point J of the semiconductor laser module 2. A broken line N is a line symmetric about the perpendicular line M to the line which is drawn with a starting point of the boundary point H and extended passing through the emitting point J.

The optical detector for monitoring 8 is directly formed on the semiconductor substrate 6 as illustrate in FIG. 2(A), and the center I of the light receiving plane 81 thereof is positioned on the same plane of the emitting point J of the semiconductor laser module 2, away from the symmetric line N opposite the point J. In other words, The optical detector for monitoring 8 is formed at a position to satisfy a $<b$, where P is the intersection of the perpendicular line M and semiconductor substrate 6, b is the distance from the center I of the light receiving plane 81 thereof to the intersection P, and a is the distance from the intersection P to the emitting point J of the semiconductor laser module 2. Since, in this embodiment, the optical detector for monitoring 8 is positioned to satisfy the above condition, when a portion of the laser light Lo emitted from the semiconductor laser module 2 is guided to the optical detector for monitoring 8, the portion of the laser light Lo is reflected and diffracted at the second diffraction area 34 by a larger angle of reflection than the angle of incident, being bent away from the optical axis of the laser light Lo.

Also, the photodetector device for monitoring 8 is located such that the light receiving plane 81 thereof lies on the same plane as the light-emitting point J of the semiconductor laser module 2 which is perpendicular to the system optical axis (in this embodiment, identical with the optical axis of the laser light Lo). The optical detector for signaling 7 is formed on the semiconductor substrate 6, on which the optical detector for monitoring 8 is also formed, and positioned away from the semiconductor laser module 2 in the direction X by a predetermined distance.

In such an optical head assembly 1 of this embodiment, a portion of the laser light Lo emitted from the semiconductor laser module 2 is reflected and diffracted at the second diffraction area 34 outwardly, i.e., in the direction away from the optical axis of the laser light Lo, to guide the reflected-diffracted light to the optical detector for monitoring 8. Consequently, compared to the case of reflecting a portion of the laser light inwardly i.e., toward the optical axis, the pitch for the second diffraction grating 341 in the second diffraction area 34 can be widened. Accordingly, the second diffraction grating 341 can be formed with high precision. In other words, a desired diffraction property can be given to the second diffraction area 34.

In the optical head assembly 1 of this embodiment, the semiconductor laser module 2, optical detector for signaling 7, and optical detector for monitoring 8 are all formed on the semiconductor substrate 6; therefore, the optical system of the optical head assembly can be constructed more easily. In addition, the second diffraction area 34 is formed on only one side of the first diffraction area 33. Besides, the individual optical detector 7, 8 respectively detects the laser light for reproduction and the laser light for monitoring for the optical recording medium 5. With these points, the optical system of the optical head assembly 1 can be constructed more easily.

Note that, in the optical head assembly 1, the second diffraction area 34 is formed on only one side in the first diffraction area 33, but the second diffraction area 34 may be formed in both sides in the first diffraction area 33. That is, the second diffraction area 34 may be formed in a position indicated by phantom line in FIG. 1(A) and FIG. 3(B). In such a case, as illustrated in FIG. 2(B), another optical detector for monitoring may be provided at a symmetric position of the optical detector for monitoring 8 about the optical axis of the laser light Lo emitted from the semiconductor laser module 2.

The semiconductor laser module 2, optical detector for signaling 7, and optical detector for monitoring 8 are not limited to be directly formed on the semiconductor substrate 6, but they may be separate components. Further, the optical detector form signaling 7 does not have to be only one, but it may be provided two or more.

Figure 6:
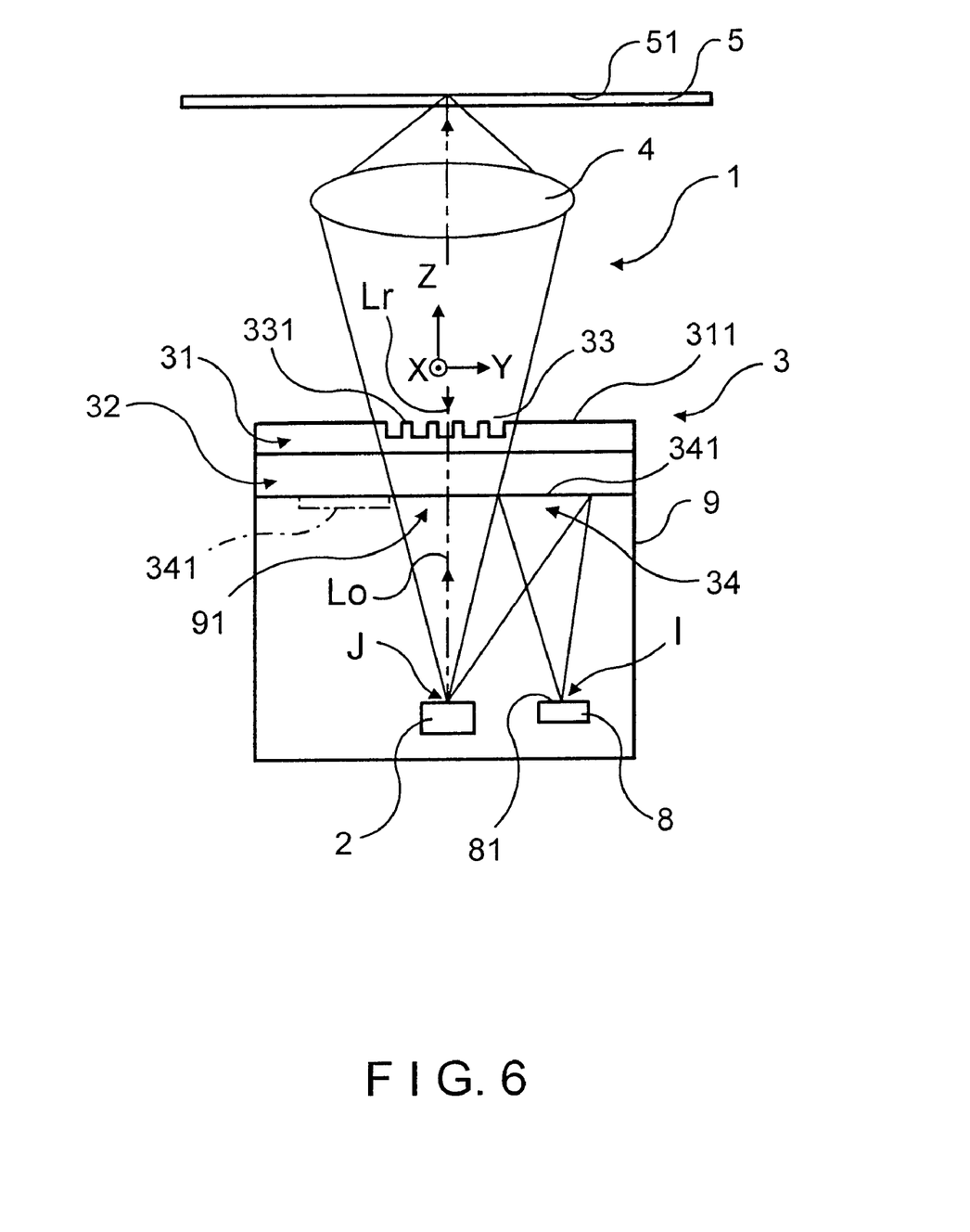
FIG. 6 illustrates a construction of a optical head assembly of another example different form the optical head assembly illustrated in FIGS. 1(A) and 1(B.).

In this embodiment, the hologram lens 3 is mounted at the portion of the light incident/exit window 91 in the package 9 such that the first surface 311 of the base substrate 31 acts as the light incident plane for the laser light Lo. However, it is possible to mount the hologram lens 3 in such a manner that the surface of the protective substrate 32 acts as the light incident plane. In this case, as illustrated in FIG. 6, the second diffraction area 34 may be formed in the surface of the protective substrate 32. It is needless to say that the second diffraction area 34 may be formed in both sides in the first diffraction area 33 even in this case, as described above.

As described above, in the optical head assembly of the present invention, a reflecting portion is formed in fringe in the second diffraction area to guide a portion of the laser light emitted from the laser light source to the optical detector for monitoring. Therefore, it is not necessary to coat a metallic film over the surface of ridges and grooves in the diffraction grating unlike a conventionally configured diffraction grating. This configuration prevents the pitch shifts and unmatched depth of the grating which is normally caused when using the metallic film coated, thus easily obtaining a desired diffraction property. Also, since the laser light is reflected and diffracted at the second diffraction area toward the optical detector for monitoring, the beam diameter of the light (monitor light) will be small on the light receiving plane of the optical detector for monitoring. Even when using a optical detector for monitoring having a small light receiving plane, a sufficient photoelectric current required for controlling the light emitting amount (light intensity) of the laser light source can be ensured. In addition, unlike the technology of forming a diffraction grating on the surface of the reflecting mirror, the second diffraction area can be small. Furthermore, a diffraction grating of grooves and ridges may be formed in the first diffraction area by etching and a metallic film and the like may be deposited in fringe on the second diffraction area by evaporation, etc. Thus, each of the diffraction areas can be formed in separate processes. Since each of the diffraction areas can be fabricated in separate processes, both diffraction gratings can be fabricated precisely at a low cost.

In the present invention, by determining a position for the optical detector for monitoring, a portion of the laser light from the laser light source is reflected and diffracted at the second diffraction area outwardly with a larger angle than the angle of incident to guide the light to the optical detector for monitoring. Therefore, the pitch of the grating in the second diffraction area can be widened, and a desired diffraction property can be easily and certainly given to the second diffraction area.

While the foregoing description and drawings represent the preferred embodiments of the present invention, it will be obvious to those skilled in the art that various changes and modifications may be made therein without departing from the true spirit and scope of the present invention.

What is claimed is:

1. A optical head assembly comprising:

a laser light source;

an objective lens for converging laser light rays emitted from said laser light source at an optical recording medium;

a hologram element placed in an optical path between said laser light source and said objective lens;

an optical detector for signaling that detects returning light rays from said optical recording medium; and an optical detector for monitoring that detects a portion of the laser beams emitted from said laser source toward said optical recording medium;

wherein said hologram element has first and second diffraction areas, said first diffraction area diffracting said returning light rays to guide them to said optical detector for signaling, said second diffraction area reflecting and diffracting a portion of said laser rays emitted from said laser light source; and wherein, upon drawing a line symmetric about a line perpendicular to said second diffraction area drawn so as to have as a starting point a boundary point of said second diffraction area closest to a light emitting point of said laser light source, from said starting point of said boundary point passing through said light emitting point, the center of a light receiving plane of said optical detector for monitoring is positioned away from said light emitting point, outer-side said line symmetric about said perpendicular line.

2. The optical head assembly as set forth in claim 1 wherein said light emitting point of said laser light source and said light receiving plane on said optical detector for monitoring are positioned on the same plane perpendicular to a system optical axis.

3. The optical head assembly as set forth in claim 1 wherein said second diffraction area includes a transparent substrate, a reflective film formed on a surface on the light incident side of said transparent substrate, and the diffraction grating formed in a surface of said reflection film; a diffraction property of said diffraction grating is set so that the laser light reflected from said second diffraction area is converged at said light receiving plane of said optical detector for monitoring.

4. The optical head assembly as set forth in claim 1 wherein said optical detectors for signaling and monitoring are formed on the same substrate.

5. The optical head assembly as set forth in claim 1 wherein said second diffraction area includes a reflecting portion and wherein said reflecting portion is formed of a metallic film.

6. The optical head assembly as set forth in claim 1 wherein a diffraction property of said second diffraction area is set so as to converge the laser light rays reflected from said second diffraction area at a light receiving plane of said optical detector for monitoring.

7. The optical head assembly as set forth in claim 1 wherein said second diffraction area includes a reflecting portion and wherein said reflecting portion is formed in a pattern corresponding to an interference fringe which, when said laser light source and said optical detector for monitoring are respectively used as light sources, spherical waves emitted from each of said light sources form in said second diffraction area.

8. The optical head assembly as set forth in claim 1 wherein said hologram element has said first diffraction area formed on one of the surfaces of a base substrate thereof and said second diffraction area is formed on the other surface thereof.

* * * * *